United States Patent [19]

Koveal, Jr.

[11] Patent Number: 6,162,373
[45] Date of Patent: *Dec. 19, 2000

[54] REMOVAL OF HYDROGEN CYANIDE FROM SYNTHESIS GAS (LAW322)

[75] Inventor: Russell John Koveal, Jr., Baton Rouge, La.

[73] Assignee: Exxon Research and Engineering Company, Florham Park, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/538,555

[22] Filed: Oct. 3, 1995

[51] Int. Cl.[7] .............................. C07C 1/02; C10K 00/00; B01D 47/00; B01J 23/40

[52] U.S. Cl. .......................... 252/373; 423/210; 502/326

[58] Field of Search ............................. 252/373; 502/326; 423/372, 352, 210; 95/291; 518/705

[56] References Cited

U.S. PATENT DOCUMENTS 4,191,664  3/1980  McArthur .
5,466,427  11/1995  Rumpf et al. ........................... 423/210

FOREIGN PATENT DOCUMENTS

| 4319234A1 | 12/1994 | Germany ....................... B01D 53/34 |
| 2 002 809 | 7/1978 | United Kingdom . |
| 2 237 814 | 10/1989 | United Kingdom . |
| 2231581 | 11/1990 | United Kingdom .............. C07C 1/04 |

OTHER PUBLICATIONS

Patent Abstracts of Japan, vol. 006, No. 102 (C–107), Jun. 11, 1982 & JP 57 032722 A (Takeda Chem Ind Ltd), Feb. 22, 1982 —abstract.

Ejsymont, Jan. Univ. lagellon, Acta Chim. (1991), 35, 125–30 1991.

Ejsymont, Jan, Univ. lagellon. Acta Chim. (1991), 34, 143–151. 1991.

*Primary Examiner*—Johann Richter
*Assistant Examiner*—Jo Parsa
*Attorney, Agent, or Firm*—Jay Simon; Jonathan N. Provoost

[57] ABSTRACT

HCN can be removed from HCN containing synthesis gas streams useful as Fischer-Tropsch feed by contacting the feed with a cobalt containing catalyst at conditions that do not promote or catalyze the Fischer-Tropsch process.

12 Claims, No Drawings

REMOVAL OF HYDROGEN CYANIDE FROM SYNTHESIS GAS (LAW322)

FIELD OF THE INVENTION

Hydrogen cyanide, HCN, is a poison, some times reversibly so, for Fischer-Tropsch hydrocarbon synthesis processes. This invention relates to a process for the removal of HCN from synthesis gas feeds to Fischer-Tropsch processes.

BACKGROUND OF THE INVENTION

Synthesis gas, hydrogen and carbon monoxide, useful as feed to Fischer-Tropsch processes is often formed by steam reforming or partial oxidation of materials such as methane, natural gas, lower hydrocarbons, coal, and the like all of which often contain nitrogen in various forms. Oxygen, as such, or air can be used in either process and leads to the presence of nitrogen in the feed to the synthesis gas plant. The presence of nitrogen in the feeds to a synthesis gas generation process often results in HCN in the synthesis gas product. (Air plants for the separation of oxygen and nitrogen are not 100% efficient.) HCN is a poison for Fischer-Tropsch processes, particularly those utilizing Group VIII metal catalysts. Catalyst activity is thus reduced, and while activity may be regained by hydrogen treatment, the interruption of the process and treatment step are economic debits for the process.

While processes exist for HCN removal, these processes are not generally capable of removing the 90+% of HCN necessary for viable Fischer-Tropsch processing and do not operate at the relatively low Fischer-Tropsch reaction temperatures, also resulting in economic debits for the process. Also, HCN is only weakly soluble in water or normal solvents and water scrubbing or gas scrubbing of the HCN containing synthesis gas is not economically attractive for further use of the gas in Fischer-Tropsch synthesis.

SUMMARY OF THE INVENTION

In accordance with this invention, the concentration of HCN in an HCN containing synthesis gas is substantially completely eliminated, e.g., at least about 90% removed, by passing the gas stream in contact with a material comprising cobalt supported on an inorganic refractory oxide under conditions that substantially minimize the Fischer-Tropsch reaction, e.g., CO conversion of less than about 10%, preferably less than about 5%, more preferably less than about 1%. The HCN is believed to be removed by a combination of hydrolysis and hydrogenation.

Because cobalt is, perhaps, the best known Fischer-Tropsch catalyst, particularly when supported on such materials as alumina, silica, or titania, care must be taken to insure that the Fischer-Tropsch synthesis is not prematurely initiated during the HCN removal step. Premature Fischer-Tropsch synthesis can be eliminated or at least very substantially minimized by two methods: (1) conducting the HCN removal step at temperatures that minimize the reaction, e.g., at temperatures of less than about 180° C., preferably less than 175° C., more preferably below about 165° C.; and (2) in the presence of a Fischer-Tropsch synthesis suppressant, e.g., a material selected from the metals or compounds of Group IA, Group IVB, Group VA, and Group VIIA elements. Preferred Fischer-Tropsch suppressants are those that can be added to the catalyst and are not easily removed therefrom, e.g., sodium, or a gas such as ammonia, which may be water scrubbed from the synthesis gas product.

DESCRIPTION OF PREFERRED EMBODIMENTS

Decreasing the concentration of HCN in HCN containing synthesis gas can be effected with cobalt metal or oxides alone or composited with other essentially inert materials, e.g., alumina, silica, silica-alumina, or titania. However, the cobalt, whether metal or oxide should be present in any composite to the extent of at least about 20 wt %, preferably at least about 40 wt %. The surface area of the material should be at least about 30 $m^2/gm$ (BET method), with a bulk density of at least about 0.2 gm/cc.

The catalyst may be reduced by treatment with hydrogen or a hydrogen containing gas by methods well known to those skilled in the art. For example, treatment with hydrogen at temperatures of about 250–450° C. for a period of 1–24 hours, or at least until a substantial amount of the cobalt present as oxide is reduced, e.g., at least about 50% of the cobalt as oxide is reduced. The surface of the catalyst may then be passivated with an oxygen containing gas to produce a layer of oxide.

The HCN removal process can be effectively conducted over a wide variety of temperatures and pressures. However, it is preferred to operate at temperatures of at least about 65° C. but below those temperatures at which the Fischer-Tropsch synthesis will be substantial, e.g., below about 180° C., preferably below about 175° C., more preferably below about 165° C. Pressures may vary between about 1–100 bar, preferably 10–40 bar. Both temperatures and pressure are selected to maximize HCN removal and minimize reheating, and compression of the synthesis gas before entering the Fischer-Tropsch reaction.

The hydrolyzed or hydrogenated HCN can be removed from the synthesis gas by any applicable method well known to those skilled in the art, e.g., water scrubbing or absorption onto a solid absorbent. The synthesis gas is then passed to a Fischer-Tropsch hydrocarbon synthesis process at temperatures of at least about 175° C., preferably at least about 180° C. to about 400° C. and pressures of about 1–100 bar, preferably 10–40 bar. Fischer-Tropsch catalysts can be Group VIII metals either bulk or in supported form. The metals may be iron, nickel, cobalt, or ruthenium, preferably cobalt, and the support may be any carrier, e.g., silica, alumina, silica-alumina, titania, preferably silica or titania. Promoters may be employed, preferably zirconium or titanium with silica supports and rhenium or hafnium with titania supports. The Fischer-Tropsch process produces $C_2+$ materials, preferably $C_5+$ materials.

The following examples will further serve to illustrate this invention but are not meant to be limiting in any way.

In the following examples the nominal catalyst composition was:

| | |
|---|---|
| cobalt metal | 20–30 wt % |
| cobalt oxide (CoO) | 20–30 wt % |
| kieselghur | 30–40 wt % |
| zirconia ($ZrO_2$) | 2–5 wt % |

The catalyst is commercially available, as United Catalysts, Inc. G67R&S.

Catalyst activation was effected at 500° F. (288° C.) for 5½ hours under synthesis gas (approximately ⅔ hydrogen/CO) at 320 psig and 39,000 or 78,000 GHSV. Testing for HCN removal was effected at similar pressure and space velocities and at temperatures of 300° F. (149° C.), 325° F.

(163° C.), and 350° F. (177° C.). The catalyst was in powder form and was diluted alpha alumina to obtain the desired space velocity. For the 39,000 GHSV test, 0.711 grams of catalyst were mixed with 10.82 grams of alpha alumina, and for the 78,000 GHSV test, 0.355 grams of catalyst were mixed with 11.25 grams of alpha alumina. The gas was passed downward through the diluted catalyst bed and was sampled immediately at the bed discharge.

The feed gas composition was, unless otherwise noted:

| | |
|---|---|
| $H_2$ | 52.5 vol % |
| CO | 15.6 |
| $CO_2$ | 7.4 |
| $H_2O$ | 15.9 |
| Argon | 8.3 |
| HCN | 215 ppmv |

EXAMPLE 1

Table 1 below shows test results, the total duration of which including catalyst activation was 29 hours.

TABLE 1

| | % HCN Removal | | |
|---|---|---|---|
| | Temperature, °F. | | |
| GHSV | 350 | 325 | 300 |
| 39,000 | 98.8 | 99.6 | 99.7 |
| 78,000 | 75.3 | 68.3 | 52.0 |

EXAMPLE 2

The following experiments were conducted at conditions similar to those above; however, Na, at levels of 500 and 5000 ppm, was added to the catalyst by aqueous impregnation with $Na_2CO_3$ followed by drying at 110° C., and activation in synthesis gas. Na is a well known dispressant (poison) for the Fischer-Tropsch synthesis.

TABLE 2

| CO conversion at | 0 | 500 ppm Na | 5000 ppm Na |
|---|---|---|---|
| 550° F. (288° C.) | 88% | 90% | 59% |
| 450° F. (232° C.) | 13% | — | 3% |
| 350° F. (177° C.) | 2% | 1% | 0% |
| 300° F. (149° C.) | 0% | 0% | 0% |
| % HCN Conversion @ 300° F. | 100% | 99% | 95% |

The results of Table 2 show that sodium was an effective suppressant for the Fischer-Tropsch synthesis at increasing amounts and at lower temperatures. The percent conversion of HCN was only little affected by increasing sodium concentration on the catalyst: a decrease of 5% in HCN conversion at a 5000 ppm sodium concentration level at 300° F.

EXAMPLE 3

The next series of experiments, tabulated in Tables 3 and 4 below, shows the effects of calcining, at 400° C. for 1–3 hours, the sodium treated catalyst at a level of 5000 ppm Na on HCN conversion and $CH_4$ yield. (The methane is produced from a methanation reaction over the cobalt catalyst that is similar to the Fischer-Tropsch synthesis). The tests were conducted at 39,000 GHSV and with a catalyst similar to that above, except that total Co loading was 30 wt %.

TABLE 3

| | % HCN Removal | | |
|---|---|---|---|
| | | 5000 ppm, Na | |
| Temperature, °F. | As Is [1] | Calcined | Uncalcined |
| 350 | 100% | 100% | 100% |
| 325 | 100% | 98.2 | 100% |
| 300 | 93.6% [2] | 87.4 [2] | 98.6 [2] |

[1] 0 ppm Na, uncalcined
[2] inconsistency by virtue of difficulty of measuring low levels of HCN CO conversion were very small and could not be measured directly, and was much less than 1%.

TABLE 4

| | $CH_4$ Yield, ppm | | |
|---|---|---|---|
| | | 5000 ppm, Na | |
| Temperature, °F. | As Is [1] | Calcined | Uncalcined |
| 350 | 106 ppm | 82 ppm | 82 ppm |
| 325 | 100 | 86 | 89 |
| 300 | 84 | 65 | 80 |

It appears that calcining makes little difference either in HCN removal or methane yield.

EXAMPLE 4

The catalyst described in Example 1 was also tested for HCN removal and CO conversion at 5000 ppm Na concentration, uncalcined, 39,000 GHSV.

TABLE 5

| Temperature, °F. | % HCN Removal | CO Conversion |
|---|---|---|
| 350 | >99.5 [1] | nil |
| 325 | 97.6 | nil |
| 300 | 94.9 | nil |

[1] below detection limit of 1 ppm in GC

The 30 wt % Co catalyst was slightly less active for HCN removal than the 60 wt % Co catalyst.

What is claimed is:

1. A process for reducing the HCN concentration from an HCN containing synthesis gas which comprises passing the synthesis gas in contact with a substantially reduced cobalt supported on a carrier under conditions substantially minimizing the Fischer-Tropsch reaction, the supported cobalt having been treated with hydrogen at temperatures of about 250–450° C.

2. The process of claim 1 wherein the temperature is less than about 180° C.

3. The process of claim 1 wherein at least about 90% of the HCN is removed and a synthesis gas of reduced HCN concentration is recovered.

4. The process of claim 1 wherein the carrier is selected from the group consisting of silica, alumina, silica-alumina, and titania.

5. The process of claim 4 wherein a suppressant for the Fischer-Tropsch reaction is present.

6. The process of claim 5 wherein the Fischer-Tropsch suppressant is a material selected from the group consisting of Group IA, Group IVB, Group VA, and Group VIIA elements and compounds.

7. The process of claim 5 wherein the Fischer-Tropsch suppressant is ammonia.

8. The process of claim 4 wherein a synthesis gas of reduced HCN concentration is recovered and is passed to a Fischer-Tropsch synthesis reaction step operating at Fischer-Tropsch conditions.

9. The process of claim 8 wherein Fischer-Tropsch synthesis conditions include pressures of about 1–100 bar and temperatures of about 180–400° C.

10. The process of claim 4 wherein the cobalt is present in amounts of about 20 to 60% by weight.

11. The process of claim 1 wherein the CO conversion during the HCN removal is less than about 10%.

12. The process of claim 1 wherein the cobalt is at least 50% reduced.

* * * * *